May 21, 1935.  R. W. DINZL  2,001,711
PORTABLE TESTING MACHINE
Filed Jan. 14, 1930  2 Sheets-Sheet 1
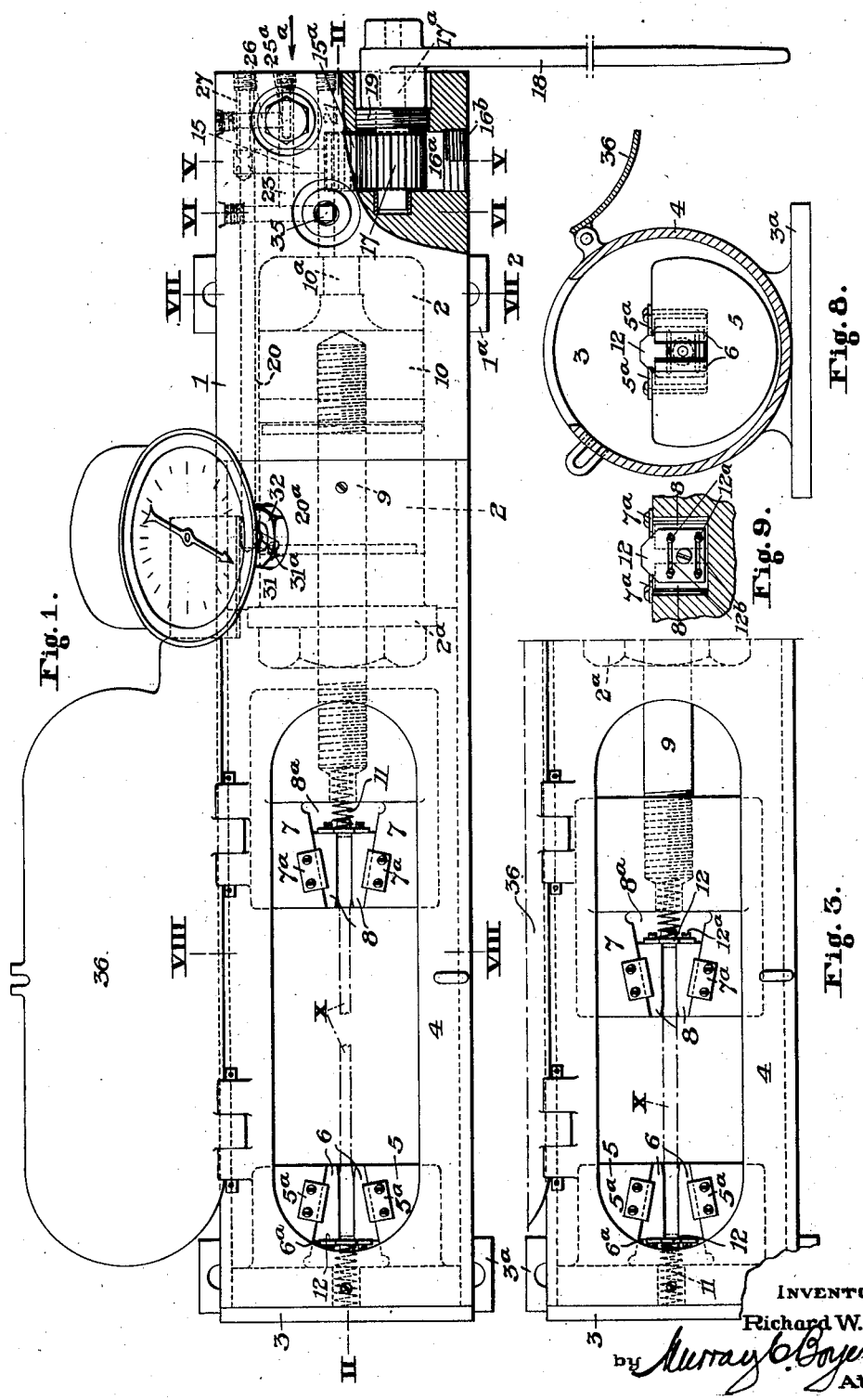
INVENTOR:
Richard W. Dinzl,
by Murray C. Boyer
Atty.

May 21, 1935.  R. W. DINZL  2,001,711
PORTABLE TESTING MACHINE
Filed Jan. 14, 1930  2 Sheets—Sheet 2
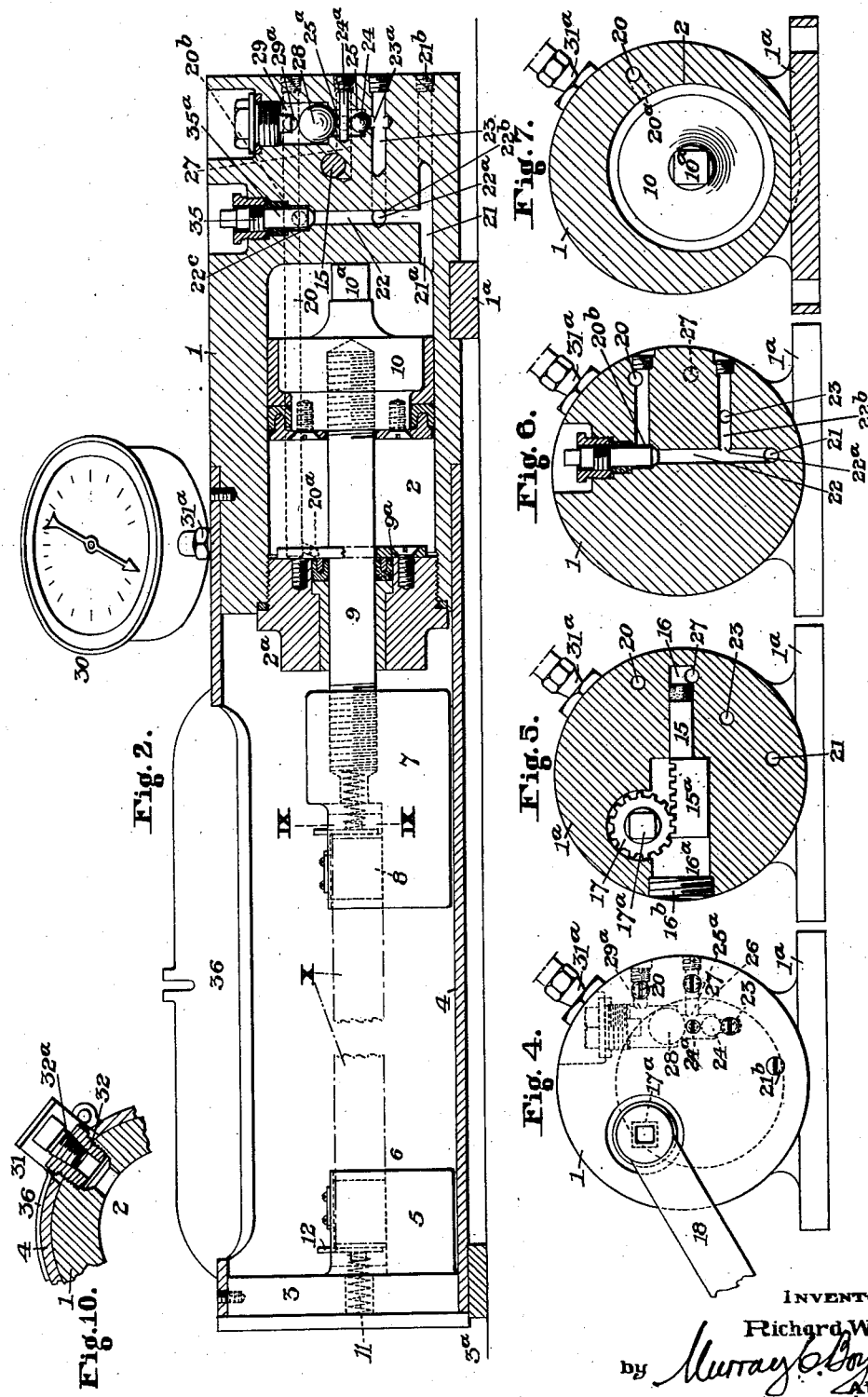
INVENTOR:
Richard W. Dinzl,
by Murray C. Boyer
Atty.

Patented May 21, 1935

2,001,711

UNITED STATES PATENT OFFICE 2,001,711

PORTABLE TESTING MACHINE

Richard W. Dinzl, Philadelphia, Pa., assignor, by mesne assignments, to Baldwin-Southwark Corporation, a corporation of Delaware Application January 14, 1930, Serial No. 420,782

4 Claims. (Cl. 265—14)

My invention relates to that type of testing machines employed for the purpose of imparting tensile stress to test specimens, and in which the testing operation may extend to the destruction of such test pieces.

One object of my invention is to provide a simple and efficient structure, portable in character.

A further object of my invention is to simplify the operation of stressing and/or breaking test specimens by providing a machine having a self-contained body of fluid, usually oil, with a manually operated self-contained pump to move said fluid and create the desired pressure to effect movement of one set of jaws employed for gripping the test piece.

A further object of my invention is to provide a portable testing machine with means permitting displacement of the body of fluid after a testing operation so that such fluid may be repeatedly utilized to move a piston or plunger to which one set of the gripping jaws is operatively connected.

And a still further object of my invention is to provide a structure with certain detachable parts so that it may be readily taken apart and/or assembled; one of such detachable parts being a gauge indicating the pressure developed.

These and other features of my invention are more fully set forth hereinafter; reference being had to the accompanying drawings, in which:

Figure 1 is a plan view, partly in section, of a portable testing machine within the scope of my invention in the open and operative position; such view also showing a cover plate which I may employ for the purpose of closing the testing space when the machine is not in use.

Fig. 2 is a side elevation of the portable testing machine shown in Fig. 1, partly in section on the line II—II.

Fig. 3 is a fragmentary view similar to a portion of Fig. 1, illustrating the gripping jaws or wedge grips in the retracted position ready for engagement with a test piece.

Fig. 4 is an end view of the testing machine, looking in the direction of the arrow $a$, Fig. 1.

Figs. 5, 6, 7 and 8 are cross sectional views on the lines V—V; VI—VI; VII—VII, and VIII—VIII, respectively, Fig. 1, looking in the direction of the arrow $a$.

Fig. 9 is a sectional elevation on the line IX—IX, Fig. 2, and

Fig. 10 is a sectional view illustrating a detail of my invention.

The improved testing apparatus or portable testing machine illustrated in the drawings may comprise an end member 1, having a cylindrical chamber 2; an end member 3 oppositely disposed with respect to the member 1, and a connecting shell or housing suitably attached to said members or integral therewith.

The end members 1 and 3 may be provided with feet $1^a$ and $3^a$ whereby the structure may be mounted upon a suitable support or base; the feet $1^a$ and $3^a$ being apertured for the reception of attaching screws. Externally the end members 1 and 3 may be of any desired contour and the connecting shell 4 may be of any suitable shape. For convenience, these parts are shown as cylindrical or substantially so but any other shape may be employed and, if desired, the end members 1 and 3 may be connected together by a skeleton frame or by longitudinal bolts, so long as said end members are stayed or held in proper alignment and fixed position with respect to each other. And it is within the scope of my invention to independently mount said end members upon a suitable support in fixed relation and proper alignment without the intervention of any connecting member.

Fixed to or integral with the end member 3 is a slotted head 5, carrying gripping jaws or wedge grips 6. In axial alignment therewith and oppositely disposed with respect thereto is another slotted head 7, carrying gripping jaws or wedge grips 8; said head 7 being connected to one end of a rod 9 whose opposite end is connected to a piston or plunger 10 disposed in the cylindrical chamber 2 formed in the end member 1. The end of this chamber 2 is closed by a head $2^a$ through which said rod 9 passes; packing to provide a fluid-tight joint being indicated at $9^a$.

The gripping jaws or wedge grips 6 and 8 are mounted in slots $6^a$ and $8^a$ having tapered walls formed in the respective heads 5 and 7, and these jaws or grips may be prevented from vertical displacement by means of detachable guards $5^a$ and $7^a$. These gripping jaws or wedge grips may be moved into position to close upon and grip a specimen by means of springs 11 disposed within the slots $6^a$ and $8^a$ and acting against plates 12 which may be loosely attached to said gripping jaws by screws $12^a$, passing through slots $12^b$ formed in said plates. The action of these springs 11 serves to move the separate sets of gripping jaws toward each other longitudinally of the machine and the tapered walls of the slots $6^a$ and $8^a$ cause the jaws of each set to move toward each other and close against a test piece or specimen when the latter has been inserted prior to the exertion of tensile stress upon the same, as indicated in Fig. 3.

The body 1 is bored to form the cylindrical chamber 2, and movable within this chamber is the piston 10, connected to the rod 9 which moves back and forth through the head 2ª; the latter being threaded into the bore of the body 1 and forming one end of the chamber 2.

The piston 10 may be moved by means of fluid pressure directed to the chamber 2 on opposite sides of said piston. The pressure to move said piston during testing stress is effected by the operation of a self-contained pump which is mounted in the end of the body 1; such pump drawing fluid from a storage space of the chamber 2 on one side of the piston 10 and delivering it to said chamber 2 on the opposite side of the piston. This fluid may be displaced with respect to the opposite sides of the piston after the testing operation, in a manner hereinafter described. Fluid (oil) may be initially introduced into the chamber 2 and subsequently supplied to compensate for any leakage through a suitable opening, normally closed by a plug, as hereinafter set forth.

The pump is clearly shown in Fig. 1 and in the cross sectional view Fig. 5; its position at the end of body 1 being indicated in Fig. 1. It may comprise a packed plunger 15, disposed in a chamber 16 formed in the end of the body 1; such plunger being operatively connected to a racked portion 15ª, which may be integral therewith and is movable in the recess 16ª. The pump plunger may be operated by means of a pinion 17 in engagement with the rack 15ª; such pinion being rocked by a hand lever 18. The racked portion 15ª is movable in the chamber or recess 16ª formed in the body 1, which may be normally closed by the plug 16ᵇ, and the pinion 17 is suitably journaled in the body 1; one bearing for the same being in the form of a hollow nut 19 which also serves to retain the same in operative position. The end of the pinion arbor 17ª which projects through this hollow nut 19 may be squared or otherwise shaped for the reception of the end of the hand lever 18, which may be readily detached when not in use.

The fluid in the storage space of the chamber 2 which is delivered therefrom by the pumping action to create the desired pressure to effect movement of the piston in the stressing direction, is delivered to the opposite end of said chamber 2 at the left of the piston (Fig. 1) via passage 20, having a port 20ª opening into said chamber adjacent the head 2ª. On the suction stroke fluid is drawn from the storage space of the chamber 2 at the right of the piston via passage 21, having a port 21ª communicating with this end of the chamber 2. From the passage 21 the fluid passes to the vertical passage 22; thence via port 22ª to a passage 23; thence via port 23ª past a small check valve 24, which may be a ball, to chamber 25; thence via port 25ª and passage 26 to passage 27 communicating with the pump chamber 16. On the pressure stroke the fluid from the pump chamber 16 passes via passages 27 and 26 and port 25ª to chamber 25, past a larger check valve 28, in the chamber 29, which check valve may also be a ball, and thence via port 29ª to said passage 20 leading to the pressure space of the chamber 2 at the left of the piston 10, and discharging therein through 20ª.

While the pressure is building up in the chamber 2 at the side of the piston 10 under the pumping action the fluid in the storage space on the opposite side of the piston is being drawn therefrom by the same pumping action. The pump chamber 16 communicates with passage or duct 27 opening via port 29ª into the chambered space 25—29 containing the check valves 24 and 28. On its suction stroke the pump plunger lifts the check valve 24, undue movement of which is prevented by the pin 24ª extending across the lower part of the chamber 25, and closes the check valve 28. On the pressure stroke the action of these check valves is reversed.

The test piece is indicated at X in the several views by broken lines; one end being engaged by the jaws or grips 6 carried by the fixed head 5, while the other end is engaged by the jaws or grips 8 carried by the head 7 connected to the piston rod 9. The test pieces may be inserted between the respective jaws by pressing them back against the springs 11, and when they are released the springs cause the jaws to firmly grip the test pieces. The operator then actuates the hand lever 18 to operate the pump plunger 15 through the cooperation of pinion 17 and the rack 15ª carried by said pump plunger.

As the pressure builds up in chamber 2 at the left of the piston, it acts upon the latter and causes it to exert a pull upon the test piece. This continued movement causes stress to be exerted upon the test piece which may continue until the elastic limit or the breaking point is reached. Undue movement of the piston is prevented by a stop member 10ª carried by the piston 10. The tapered slots receiving the gripping jaws cause the latter to firmly grip the test piece as the stressing action is being applied. A gauge 30 communicating with the chamber 2 registers the amount of pressure developed during the testing operation. This gauge is detachably mounted and may be connected to said chamber 2 at the point 31. When the machine is not in use and the gauge has been detached, the opening in the fixed bushing 32 receiving the gauge nipple 31ª and communicating with the chamber 2 may be closed by a plug 32ª.

After the desired test has been completed and the specimen has been stressed to its elastic limit or fractured, the operator releases the fluid in chamber 2 by opening or backing off a plug valve 35, which is provided with a stem 35ª fitting a seat 22ᶜ at the upper end of the vertical passage 22, uncovering a port 20ᵇ communicating with the passage 20.

When the stem of this plug valve 35 has been unseated, the fluid admitted to the side of the chamber 2 at the left of the piston to create the desired pressure may escape to the storage space of the chamber 2 at the right of the piston via said passage 22 and the passage 21; the check valves 24 and 28 preventing movement of the fluid in the opposite direction. The plug valve is suitably packed to prevent any leakage, and is firmly seated during a testing operation.

By reason of the arrangement of internal passages the fluid may be passed and repassed between opposite sides of the piston; allowing the same fluid to be used over and over and requiring no connection with an outside source of supply. If, because of leakage, it becomes necessary to replenish the fluid, this may be accomplished by removing one of the plugs closing one of the bored passages, plug 21ᵇ for instance, normally closing passage 21, adding the desired amount, and then replacing such plug. The initial supply of fluid may be introduced at this point.

The stressed or ruptured test piece may be released by opening the gripping jaws in the same manner as when inserting such test piece. With the plug valve 35 unseated, the operator may then pull the movable head 7 carrying the gripping jaws 8 back to the starting position. This is readily accomplished because the open position of the stem of the plug valve 35 allows free movement of the liquid between the spaces of the cylinder 2 on opposite sides of the piston 10. For the sake of clarity the chamber 2 and the several passages in the body 1 of the testing machine between said chamber and the pump chamber 16 are shown empty.

The space between the end members 1 and 3 is open during a testing operation. This space may be covered when the apparatus is not in use or when it is being transported by closing the lid 36, after the gauge has been removed.

From the foregoing description, it will be seen that simple and efficient means are herein provided for accomplishing the objects of the invention, but while the elements shown and described are well adapted to serve the purposes for which they are intended, it is to be understood that the invention is not limited to the precise construction set forth, but includes within its scope such changes and modifications as may be made within the scope of the appended claims.

I claim:

1. In a portable testing machine, the combination of a fixed and a movable head arranged in horizontal positions, grips carried by each of said heads, an elongated chambered body, a piston movably mounted in one chamber of said body and operatively connected to said movable head, a pump contained in another chamber of said body for delivering fluid pressure to the chamber receiving said piston; said piston chamber also providing storage space for said fluid, means for operating said pump; said chambered body having a passage formed in the wall thereof and extending longitudinally of the same and ports and passages communicating with the spaces of said piston chamber on both sides of said piston and said longitudinal passage, and a movable valve for closing one of said ports and passages during a testing operation.

2. In a portable testing machine, the combination of a fixed and movable head arranged in horizontal positions, grips carried by each of said heads, an elongated chambered body, a piston movably mounted in one chamber of said body and operatively connected to said movable head, a pump contained in another chamber of said body for delivering fluid pressure to the chamber receiving said piston; said piston chamber also providing storage space for said fluid and said chambered body having a passage formed in the wall thereof and extending longitudinally of the same and ports and passages communicating with the spaces of said piston chamber on both sides of said piston and said longitudinal passage, and a movable valve for closing one of said ports and passages during a testing operation.

3. In a portable testing machine, the combination of a pair of oppositely disposed members horizontally arranged in fixed relation, a fixed head carried by one of said members, a movable head reciprocably mounted with respect to said fixed head and the other fixed member, grips carried by each of said heads between which a test specimen may be held; said last-named fixed member having an elongated chambered body, a piston movably mounted in one chamber of said chambered body, a rod connected to said piston and carrying said movable head, a pump contained in another chamber of said body for directing fluid pressure to the chamber receiving said piston; said piston chamber also providing storage space for said fluid, means for operating said pump; said second fixed member having ports and passages whereby the pumping action may deliver the body of fluid from the storage space to the pressure side of said piston and one of said passages formed in the wall of said body and extending longitudinally of the chambered body with ports and passages affording communication between the same and the spaces of said piston chamber on both sides of said piston and said longitudinal passage, and means for closing one of said ports and passages during a testing operation.

4. In a portable testing machine, the combination of a pair of oppositely disposed members horizontally arranged in fixed relation and alignment, a fixed head carried by one of said members, a movable head reciprocably mounted with respect to said fixed head and the other fixed member, grips carried by each of said heads between which a test specimen may be held; said last-named fixed member having an elongated chambered body, a piston movably mounted in one chamber of said chambered body, a rod connected to said piston and carrying said movable head, a pump contained in another chamber in said last-named fixed member; said piston chamber also providing storage space for said fluid, means for operating said pump, said second fixed member having ports and passages whereby the pumping action may deliver the body of fluid from the storage space to the pressure side of said piston and one of said passages formed in the wall of said body and extending longitudinally of the chambered body with ports and passages affording communication between the same and the spaces of said piston chamber on both sides of said piston and said longitudinal passage, and a movable valve for closing one of said ports and passages during a testing operation.

RICHARD W. DINZL.